United States Patent Office 3,251,703
Patented May 17, 1966

3,251,703
CEREAL-FLOUR ADHESIVE PRODUCT
AND PROCESS
Cecil G. Fortney, Jr., and Kenneth R. Hunt, Kankakee, Ill., assignors to General Foods Corporation, White Plains, N.Y., a corporation of Delaware
No Drawing. Filed Oct. 26, 1962, Ser. No. 233,432
11 Claims. (Cl. 106—151)

This invention relates to a novel adhesive and a method for manufacturing same. More particularly, it concerns a dry, potentially adhesive composition and a liquid adhesive formed therefrom which is specifically adapted for use in the manufacture of corrugated boxboard.

Corrugated boxboard as presently manufactured is a three-ply structure united by adhesives, commonly starch-base adhesives. This form of structure has achieved wide acceptance as a packaging material. An initial step in making corrugated boxboard takes place at a single facer machine where paper ply in sinusoidal form, known as the medium, is affixed to a substantially planar sheet of paperboard, known as the liner. To adhere the medium and the lined, a dispersion of ungelatinized starch granules suspended in a medium of suitable viscosity is located on the medium, and shortly thereafter heat and pressure are applied to both the medium and the liner to force them together and gelatinize the starch granules therebetween. Under the application of such heat and pressure, the starch granules swell, take up available moisture and produce a strong adhesive bond between the liner and the medium.

To complete the formation of the corrugated boxboard, the single facer sheet, consisting of the bonded liner and medium, is subjected to a secondary bonding treatment performed by means of a double backer machine. In this bonding treatment another planar sheet of paper is adhered to the medium through the intermediation of a starch adhesive located at the apexes of the medium opposite those apexes at which the medium is attached to the liner. The starch dispersion used at the double backer machine is more viscous than that utilized at the single facer machine. Again heat is applied to cause the starch in the more viscous dispersion to swell, take up moisture and create a strong bond. Thus, the corrugated structure consists of two substantially planar sheets bonded to opposite sides of a sinusoidal shet by an adhesive which obtains its properties through the in situ gelatinization of ungelatinized starch granules.

Because the ungelatinized starch granules, themselves, are not sufficiently viscous to form a paste of the correct consistency for application by means of the rolls of the single facer or double backer machines, a process commonly known as the Stein-Hall process has become the accepted method of preparing starch-base adhesives for use in the manufacture of corrugated board. In the Stein-Hall process, a minor portion, usually about one-sixth of the total quantity of starch used, is complete pregelatinized with water and sodium hydroxide to form a viscous carrier. This carrier portion is subsequently blended with a major portion of starch mixed with water and borax, usually about five-sixths of the total starch, which major portion comprises ungelatinized raw starch. The viscosity of the final adhesive is dependent upon the amount of starch employed in the carrier. Upon the subsequent application of heat and pressure during corrugating, it is the ungelatinized starch which contributes the bonding characteristics of the starchy material; the pregelatinized starch has as its primary function that of carrying the ungelatinized starch and adds little to the final bonding power but contributes mainly to the tackiness of the adhesive suspension.

Other types of adhesives have been attempted in the manufacture of corrugated board, but none of these adhesives has met with marked commercial success in recent years. Such lack of success can be attributed in part to the reluctance of boxboard manufacturers to invest in new equipment to replace their present equipment which now produces a satisfactory product. In particular, attempts to use grain flours, e.g. corn flour, as a replacement for corn starch used in the Stein-Hall proces has not been successful. A substitution of flour for starch in toto in the carrier portion of the adhesive results in a viscous mass having a much higher initial viscosity than a blend formulated from "pearl" starch alone. Further, when the blend of carrier made from flour and ungelatinized portions is allowed to stand without agitation for even a relatively short period of time, it coagulates into a thick thixotropic gel; such gelation is referred to as "set back." The formation of a thixotropic gel reduces the ability of the adhesive to flow and fouls the corrugator by building up deposits of gelled adhesive on the adhesive applicator parts, i.e., the fingers of the single facer machine. To prevent thixotropy, it is necessary to reduce substantially the proportion of the gelatinized carrier portion of the final blend. Such a reduction, however, results in a concurrent lessening of the viscosity of the blend, and as a result, the blend is easily drawn from the rolls used to apply the adhesive. Such lack of viscosity and tackiness results in waste and unsatisfactory bonding due to a scattered adhesive pattern on the paper ply.

It has, therefore, long appear desirable to utilize flour, particularly corn flour because of its substantial economic advantages, in lieu of starch in the preparation of an adhesive composition for use in the manufacture of corrugated boxboard. Further, it has also been recognized as a problem to provide a single-step method of preparing the adhesive, i.e., it would appear desirable that the adhesive be formed in a single dispersion step instead of having to gelatinize a portion of the starch to form a carrier portion and then to combine the carrier portion with the ungelatinized starch portion of the adhesive. While the prior art has proposed at least one solution to the problem of forming a starch adhesive in a single step, it has now been discovered that a highly desirable and effective boxboard adhesive can be formed in a single dispersion step and, moreover, that flour can be used as the bonding ingredient in the single-step prepared adhesive. Our invention is based upon the discovery that certain gums, both natural and synthetic, in combination with flour, water and the borax and sodium hydroxide commonly used in the preparation of boxboard adhesive, provide the necessary viscosity which permits the adhesive to be applied by means of single facer or double backer machines without the necessity of preparing a separate carrier portion in order to supply the requisite body to the liquid adhesive. Further, the use of this gum or combination of particular gums permits corn flour to be utilized in place of ungelatinized corn starch, with a significant saving attendant thereon. An important embodiment of our discovery is a physical combination in substantially dry form of a flour and a selected gum or gums which may be either natural or synthetic. Other embodiment are a dry adhesive and methods of preparing liquid adhesives therefrom.

The flour which is an ingredient in the dry composition suitable for use as a potential adhesive in the manufacture of corrugated boxboard may be a grain such as wheat, barley, rye, or grain sorghum, but corn flour has been found particularly advantageous for use, primarily because of the exceptional economies which are obtained by such utility. In addition, such tuberous vegetables as potatoes and tapioca can be utilized in the form of flour. Since corn starch is presently used in the manufacture of boxboard adhesive, however, with good results, it would appear economically improvident to substitute a flour for "pearl" corn starch when the flour would result in an increased cost of manufacturing the adhesive. Consequently, corn flour is presently contemplated as being the prime flour which will be used to form the dry potential adhesive and the liquid adhesive prepared therefrom.

The flour which is to be utilized in the present composition must be that which is broadly defined as finely ground. By finely ground flour is meant flour, most preferably corn flour having only a low percent of the starch granules damaged and a particle size at which at least 80 percent passes a USS No. 200 sieve and not more than 1 percent remains on a USS No. 70 sieve. Preferably, 95 percent of the flour will pass a USS No. 200 sieve and not more than 1 percent will remain on a USS No. 100 sieve. In addition, not more than 10 percent should remain on a USS No. 140 sieve. While the maximum particle size which can be permitted may vary in accordance with the particular source of the flour used, the following table sets forth a typical preferred particle size of the flour which is to be used in combination with a gum acceptable to form our dry potential adhesive as well as the granulation range of the flour:

TABLE I

| USS Sieve Sizes | Typical Granulation, percent | Granulation Range |
| --- | --- | --- |
| On 70 | 0.5 | 1.0% max. |
| 100 | 0.5 | 1.0% max. |
| 140 | 10.0 | 10.0% max. |
| 200 | 10.0 | 10.0% max. |
| Through 200 | 80.0 | 80.0% min. |

Different types of materials can be used as starting materials for the finely ground flour which is one element of our potentially adhesive composition. If the flour to be utilized is finely ground corn flour, it has been found convenient to start with what is known as straight mill corn flour for the preparation of the finely ground corn flour. Straight mill corn flour is that which is obtained during normal degermination, grinding and bolting of corn in a dry process corn mill. Such corn flour has the following composition:

TABLE II

| Component | Typical Range, percent | Typical Analysis, percent |
| --- | --- | --- |
| Moisture | 10.0–18.0 | 13.0 |
| Protein | 5.0–9.5 | 7.0 |
| Fat | 0.5–3.5 | 2.0 |
| Fiber | 0.5–2.0 | 1.0 |
| Ash | 0.5–2.0 | 1.0 |

In addition to the above chemical composition, corn flour prior to the fine grinding step will advantageously conform to what is known as corn flour granulation, which is defined in the trade as flour of such granulation that 100 percent will pass a USS No. 60 sieve. More explicitly, straight mill corn flour will have a typical granulation analysis as follows:

TABLE III

USS sieve sizes:     Typical granulation, percent
  On 60 ------------------------------- 0.0
  70 ---------------------------------- 1.0
  100 --------------------------------- 35.0
  140 --------------------------------- 30.0
  200 --------------------------------- 15.0
  230 --------------------------------- 6.0
  Through 230 ------------------------ 10.0

The reason for beginning with straight mill corn flour prior to the fine grinding step is to permit the grinding to take place at temperatures substantially below the gelatinization temperatures of the starch in the flour. In order to effect such controlled temperature, grinding must take place under conditions at which the temperatures due to frictional forces are not permitted to rise above the gelatinization temperature of the starch during the fine grinding process. Relatively slow grinding with or without external cooling means is preferred. Thus, careful fine grinding will minimize mechanical starch breakdown. Straight mill corn flour may also be bolted. Likewise, either straight mill or finely ground flour can be air classified to obtain the finer particles, the last-named technique having an additional advantage in that it reduces the protein level of the finely ground flour because of the selective separation which can be obtained by means of air classification. In the particular case of corn flour, it has been found that the temperature of the flour during grinding should not be allowed to exceed about 150° F. so that gelatinization of the corn starch will not occur.

It is also possible to utilize other dry corn mill materials such as hominy grits as starting materials in the preparation of finely ground flour; however, straight mill corn flour is preferred since in the production of flour from grits there might occur excessive rupture and possible dextrinizing-type damage of the starch granules. This physical damage to the starch component of the flour must be controlled, for it has been found to have a critical influence upon the final performance characteristic of the finely ground flour in use as an adhesive.

After fine grinding to produce a flour having granulation sizes in accordance with Table I above, the finely ground corn flour appears under polarized light to have approximately 85 to 95 percent, typically 90 percent, of its granules exhibit Maltese cross configurations, approximately 2 to 9, say 5 percent of these configurations being indistinct and the granules partially swollen. These latter particles represent damaged starch chains which will contribute to the viscosity of the corn flour. While a small amount of starch damage will not necessarily destroy the effect of the flour for its intended use, too much damage will give rise to the high viscosity characteristics which promote a thixotropic tendency during usage.

The differences between finely ground corn flour and unmodified "pearl" corn starch are clearly apparent when both are viewed microscopically under polarized light. The corn flour particles show a greater variation in size and shape, while the "pearl" corn starch has granules of substantially uniform size and shape, about 99 percent of which have plainly visible Maltese crosses. Finely ground corn flour and "pearl" corn starch also differ in their typical chemical analyses, which are set forth below:

TABLE IV

| Component | Ranges of Typical Analyses | |
| --- | --- | --- |
| | Pearl Corn Starch | Fine Grind Flour, percent |
| Moisture | 10–12% | 10.0–13.0 |
| Protein | Less than 0.5% | 5.0–9.5 |
| Fat | Less than 0.5% | 1.0–3.5 |
| Fiber | Less than 0.5% | 0.5–2.0 |
| Starch (dry basis) | 98–99% | 86.0–92.0 |

The finely ground corn flour of a granulation size and chemical analysis as set forth in Tables I and IV hereinbefore cannot be used as a direct substitute for "pearl" corn starch in the preparation of a conventional Stein- Hall corrugating adhesive paste. Just as straight mill corn flour is unsuitable because of its tendency to "set back" in corrugating, the same thixotropy is evident in finely ground corn flour. It has been thought that this thixotrophy or surface gelling is contributed at least in part by the protein content of the flour. For reasons which are not known at this time, the use of finely ground corn flour with a suitable gum negatives the tendency of the flour to set back. Thus, it is believed that the combination with a grain or tuberous flour having particle sizes which are quite small, for the first time permits on a commercial scale the use of flour in place of the conventional "pearl" corn starch now in widespread commercial use.

The gum or gums which may be used in physical mixture with the finely ground corn flour to yield a dry potential adhesive according to this invention may be either natural or synthetic gums. While the precise characteristics of a suitable gum are difficult to define, it must be capable of increasing the viscosity of an aqueous dispersion of finely ground corn flour, borax and sodium hydroxide without exhibiting a substantial loss of its viscosity and surface tension characteristics within a pH range of 8 to 14 and a temperature range of 90° to 120° F. Also, it must not have such thixotropy as will substantially impair the usefulness of the adhesive in boxboard manufacture. While it has been impossible to test every natural and synthetic gum to determine whether it will or will not be operative for use with a finely ground flour in boxboard manufacture, the following results can be tabulated:

TABLE V

Operative gums:
 Alkali metal salt of carboxymethylcellulose
 Hydroxyethylcellulose
 Okra gum
 Methylcellulose Inoperative gums:
 Gum arabic
 Gum tragacanth
 Guar gums
 Pectins
 Gelatins
 Algins
 Kelgins
 Locust bean gum
 Periodate oxidized starch It is not presently understood why certain gums have proved operative for the present use and others have not; however, the operative ratio of gum to flour in a substantially dry potential adhesive has been found to vary from about .005 to .05. Those skilled in the art will be able to examine other natural and synthetic gums in order to determine whether they fall within the terms of the present invention. In general, the gum must also be one which will markedly increase and sustain the viscosity of a 15 to 25 percent starch slurry in the presence of sodium hydroxide and borax.

As is well known to those skilled in the art of boxboard adhesives, an adhesive paste suitable for application by means of conventional Stein-Hall equipment is one which has a viscosity of about 20 to 60 modified Zahn cup seconds. It has generally been found that a desirable range for application in a single facer is 20 to 35 seconds, while a preferred viscosity range in a double backer is 35 to 60 seconds. Thus, sufficient gum must be present in the adhesive paste to provide such viscosity levels where there is only slight gelatinization of the starch granules in the finely ground flour. It has been noted that a relatively minor degree of gelatinization of flour starch granules is not sufficient to effect "set back" or premature gelation of the viscous paste on the applicator roll, but does increase somewhat the viscosity of that paste. Thus, it would appear desirable that while no degree of gelatinization of the starch granules in the finely ground flour is necessary for the operation of the present invention, some small degree of gelatinization will not be harmful and may even be advantageous because it increases the viscosity of the paste and therefore makes requisite the use of less gum in order to attain a predetermined viscosity range. As explained hereinbefore, however, excessive gelatinization of the starch granules of the flour results in "set back" and loss of adhesive characteristics when the heat and pressure of the applicator rolls of the single facer or double backer are applied to the flour.

A viscous paste suitable for being applied to paper and paperboard plies to form a corrugated boxboard structure by means of applicator rolls is one which has a total solids content of about 15 to 25 percent. The flour-gum mix contains gum in a range of 0.5 to 5.0 percent of the flour. Based on a hundred parts by weight of the flour-gum mix, borax (sodium borate) is used in a range of 1.9 to 2.9 parts and sodium hydroxide is used in a range of 1.6 to 3.5 parts. Viscosity control is obtained by varying the proportions of the ingredients, and according to whether the paste is being utilized on the applicator roll of a single facer or double backer, the viscosity will vary respectively in ranges of about 20 to 35 and 35 to 60 modified Zahn cup seconds. It has been found preferred to operate at the lower ends of the viscosity ranges, viz., a range of 20 to 25 seconds in the single facer and 35 to 38 seconds in the double backer. The finished starch paste having a gelatinization temperature of 148° to 150° F. when formed from corn flour and requiring only about one-half hour to prepare as compared to the one to one and one-half hours which is the standard preparation time when the Stein-Hall process is utilized. In addition, the viscosity is more uniform throughout the paste, and it has been found easy to adjust the adhesive properties, i.e., the gelatinization temperature and hardness or softness of the gelled starch by varying the sodium hydroxide and borax levels. The viscosity may be adjusted after preparation over a moderate range so that the particular viscosity desired may be attained in all cases. In contrast, in the preparation of conventional adhesive batches, the sodium hydroxide and borax levels cannot be changed after the preparation of the paste because such alteration will adversely influence the properties of the paste.

The novel dry potential adhesive, adhesive paste, and method of preparing the adhesive and the paste will all be better understood by reference to the following illustrative examples:

*Example I*

Straight mill corn flour was finely ground on a Pulvocron grinder manufactured by Strong Scott Pulverizer Company, Minneapolis, Minnesota, until several hundred pounds of fine grind corn flour were obtained. During the grinding, the temperature was maintained below 150° F. After grinding, the flour had a granulation size at which 0.5 percent remained on USS Nos. 70 and 100, sieves, 5.0 percent on a USS No. 140 sieve, 10.0 percent on a USS No. 200 sieve, and 84.5 percent passed through a USS No. 200 sieve. As prepared, the fine grind corn flour appeared under polarized light to have approximately 90 percent of its starch granules marked with Maltese cross configurations, about 5 percent of these configurations being indistinct or the granules partially swollen. The corn flour was then blended with 1.9 percent of its weight of the sodium salt of carboxymethylcellulose and 600 pounds of the corn flour-gum mixture were added to 1,520 pounds of 90° to 100° F. water containing 15 pounds of borax and agitated until a homogeneous dispersion was obtained. To this dispersion 15 pounds of 76 percent (as $Na_2O$) caustic soda dissolved in 900 pounds of 90° to 110° F. water was added over a 15- to 20-minute period. The resulting mix was agitated to a uniform viscosity of 40 to 45 seconds (modified Zahn cup), and the adhesive was used to produce approximately 600,000 square feet of corrugated board in a double backer operation. A similar batch of adhesive was made for single facer corrugating application with a viscosity of 30 to 35 seconds. This viscosity range was achieved by a slight reduction in the quantity of flour-gum mix used. Adhesive prepared in the latter manner was used to make approximately the same amount of corrugated board on a single facer machine.

The adhesive batches as prepared above were judged satisfactory. The finished corrugated board using these adhesives was judged excellent as determined by pin adhesion and flat crush tests, as well as subjective tests, by skilled persons in the trade.

*Example II*

Fine mesh wheat flour was obtained by hand brushing standard commercial wheat flour over a 200-mesh USS sieve. The thrus, which represented about 80 percent of of the total flour weight, were blended with 2.5 percent of the weight of hydroxyethylcellulose and the remainder of the wheat material discarded. The flour-gum mix was then utilized in the preparation of a paste adhesive in the same maner as that described in Example I. The paste adhesive and the finished corrugated board prepared through the use of that adhesive were both adjudged satisfactory.

*Example III*

A flour-gum mix was prepared from potato flour and okra gum, the natural gum constituting 4.3 percent by weight of the potato flour, 95 percent of which passed a USS No. 200 sieve. The paste adhesive and corrugated board prepared through the use of this mix in accordance with the method of Example I were likewise judged satisfactory.

It is recognized that the prior art has been cognizant of the efficacy of an alkali metal salt of carboxymethylcellulose in order to provide requisite viscosity to a "pearl" starch adhesive in connection with Stein-Hall apparatus. Such use has been described in U.S. Patent No. 3,015,572 to Casey et al. The use of that same salt to make practical for the first time the utilization of a flour such as corn flour in the preparation of adhesive has not been recognized, and likewise it has not been recognized that certain other natural and synthetic gums in addition to an alkali metal salt of carboxymethylcellulose can have the same use. The dry potential adhesive and the paste described herein, moreover, are specific combinations which have not been known by those skilled in this art.

It will be apparent that certain alterations and modifications in the invention described hereinbefore will be obvious to those skilled in the art without departing from the scope of the invention. All such obvious alterations and modifications are deemed to be included within the purview of the present invention, which is to be limited only by the scope of the following appended claims.

What is claimed is:

1. A substantially dry mixture adapted for use as an adhesive in the manufacture of corrugated board, consisting essentially of flour selected from the group consisting of cereal and tuberous flours, said flour having a particle size whereat at least 80 percent passes a USS No. 200 sieve and not more than 1 percent remains on a USS No. 70 sieve, and a gum selected from the group consisting of carboxymethylcellulose, hydroxyethylcellulose, methylcellulose and okra gum, the ratio of gum to flour from about .005 to about .05 part by weight of gum to about one part by weight of flour.

2. A mixture as claimed in claim 1, in which a minimum of 95 percent of said flour passes a USS No. 200 sieve.

3. A mixture as claimed in claim 1, in which 85 to 95 percent of said flour exhibits Maltese cross configurations under polarized light and about 2 to 9 percent of said particles exhibiting said configurations are partially swollen.

4. A mixture as claimed in claim 1, in which said flour is corn flour having a particle size whereat not more than 1 percent remains on a USS No. 100 sieve, not more than 10 percent remains on a USS No. 140 sieve, and at least 80 percent passes a USS No. 200 sieve.

5. A mixture as claimed in claim 4, in which said corn flour has the following composition (dry basis): starch, 88 to 92 percent; protein, 5 to 9.5 percent; fat, 1.0 to 3.5 percent; fiber, 0.5 to 2.0 percent; and moisture, 10 to 18 percent.

6. A method for preparing a substantially dry mixture for use as an adhesive for boxboard, comprising fine milling cereal flour, 100 percent of which passes a USS No. 60 sieve while maintaining the temperature of the flour below the gelatinization temperature of the starch thereof until not more than 1 percent remains on a USS No. 70 sieve and at least 80 percent passes a USS No. 200 sieve, and blending the fine-milled cereal flour with about 0.5 to 5 percent by weight of a gum selected from the group consisting of carboxymethylcellulose, hydroxyethylcellulose, methylcellulose and okra gum.

7. A method as claimed in claim 6, in which said cereal flour is corn flour which, prior to milling, has the following composition: starch (dry basis), 86 to 92 percent; protein, 5 to 9.5 percent; fat, 0.5 to 3.5 percent; fiber, 0.5 to 2.0 percent; ash, 0.5 to 2.0 percent; and moisture, 10 to 18 percent.

8. A method of forming a flour adhesive suitable for gelatinization between plies of paper and paperboard when heat at the gelatinization temperature of the starch of the flour is applied to the adhesive to bond the plies to each other for manufacture of boxboard, comprising dispersing in water flour selected from the group consisting of cereal and tuberous flours having a particle size whereat at least 80 percent passes a USS No. 200 sieve and not more than 1 percent remains on a USS No. 70 sieve, a gum selected from the group consisting of carboxymethylcellulose, hydroxyethylcellulose, methylcellulose and okra gum, borax and sodium hydroxide, the ratio of the ingredients being by weight 1.6 to 3.5 parts of sodium hydroxide to 1.9 to 2.9 parts of borax to 0.5 to 5.0 parts of said gum to 95.0 to 99.5 parts of said flour, said dispersion having a total solids content of 15 to 25 percent.

9. A method of forming a flour adhesive suitable for gelatinization between plies of paper and paperboard when heat at the gelatinization temperature of the starch of the flour is applied to the adhesive to bond the plies to each other for manufacture of boxboard, comprising dispersing in water a flour selected from the group consisting of cereal and tuberous flours having a particle size whereat at least 80 percent passes a USS No. 200 sieve and not more than 1 percent remains on a USS No. 70 sieve, a gum selected from the group consisting of carboxymethylcellulose, hydroxyethylcellulose, methylcellulose and okra gum, borax and sodium hydroxide, the ratio of the ingredients being by weight 1.6 to 3.5 parts of sodium hydroxide to 1.9 to 2.9 parts of borax to 0.5 to 5.0 parts of said gum to 95.0 to 99.5 parts of said flour, said dispersion having a total solids content of 15 to 25 percent, said dispersion having a gelatinization temperature of about 148° to 153° F. and a viscosity of 20 to 60 modified Zahn cup seconds.

10. A viscous boxboard adhesive material suitable for gelatinization between plies of paper and paperboard when heat at least at the gelatinization temperature of the starch of the adhesive is applied thereto, comprising flour selected from the group consisting of corn, wheat, barley, rye, grain sorghum, potato and tapioca flours, a gum selected from the group consisting of carboxymethylcellulose, hydroxyethylcellulose, methylcellulose and okra gum, borax and sodium hydroxide, the ratio of the ingredients by weight being 1.6 to 3.5 parts of sodium hydroxide to 1.9 to 2.9 parts of borax to 0.5 to 5.0 parts of said gum to 95.0 to 99.5 parts of said flour, said adhesive having a total solids content of 15 to 25 percent.

11. A flour adhesive as claimed in claim 10, in which said flour is corn flour and said adhesive has a gelatinization temperature of about 148° to 153° F. and a viscosity of 20 to 60 Zahn cup seconds.

References Cited by the Examiner

UNITED STATES PATENTS

| | | | |
|---|---|---|---|
| 2,764,568 | 9/1956 | Hawkins. | |
| 2,999,028 | 9/1961 | Horner | 106—150 |
| 3,015,572 | 1/1962 | Casey et al. | |
| 3,049,434 | 8/1962 | Harrison | 106—194 |

ALEXANDER H. BRODMERKEL, *Primary Examiner.*

MORRIS LIEBMAN, *Examiner.*

D. J. ARNOLD, *Assistant Examiner.*